United States Patent
Takahashi

(10) Patent No.: US 8,668,412 B2
(45) Date of Patent: Mar. 11, 2014

(54) MACHINING METHOD AND MACHINE TOOL

(75) Inventor: Ikuma Takahashi, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 861 days.

(21) Appl. No.: 12/920,513

(22) PCT Filed: Mar. 4, 2008

(86) PCT No.: PCT/JP2008/054240
§ 371 (c)(1),
(2), (4) Date: Sep. 1, 2010

(87) PCT Pub. No.: WO2009/110101
PCT Pub. Date: Sep. 11, 2009

(65) Prior Publication Data
US 2011/0014001 A1    Jan. 20, 2011

(51) Int. Cl.
*B23C 1/12* (2006.01)

(52) U.S. Cl.
USPC ........... 409/132; 409/186; 409/193; 409/201; 409/216

(58) Field of Classification Search
USPC ......... 409/131–132, 186–188, 193–195, 201, 409/211, 216
IPC ...................................... B23Q 17/09
See application file for complete search history.

(56) References Cited

U.S. PATENT DOCUMENTS

| | | | | |
|---|---|---|---|---|
| 4,559,577 A * | 12/1985 | Shoji et al. | ...................... | 361/31 |
| 4,604,006 A * | 8/1986 | Shoji et al. | ...................... | 408/76 |
| 5,584,621 A * | 12/1996 | Bertsche et al. | ............. | 409/201 |
| 7,293,340 B1 * | 11/2007 | Tsao et al. | ...................... | 29/428 |
| 7,470,095 B2 * | 12/2008 | Brunemann | .................. | 409/201 |

FOREIGN PATENT DOCUMENTS

| | | | |
|---|---|---|---|
| DE | 102007032826 A1 * | 1/2008 | |
| DE | 102006054475 A1 * | 5/2008 | |
| DE | 102010037737 A1 * | 3/2012 | |
| EP | 784253 A1 * | 7/1997 | |
| EP | 1038630 A1 * | 9/2000 | |
| JP | 06289917 A | 10/1994 | |
| JP | 07328896 A * | 12/1995 | |
| JP | 11138380 A | 5/1999 | |
| JP | 2001150287 A | 6/2001 | |

* cited by examiner

*Primary Examiner* — Daniel Howell
(74) *Attorney, Agent, or Firm* — Paul & Paul

(57) ABSTRACT

A minimum five-axis machine tool (11) has first to third linear feed axes orthogonal to each other as well as first and second rotational feed axes orthogonal to each other, wherein a rotational axis line of the first rotational feed axis C is parallel to the first linear feed axis Z. While a tool T and a work W are moved relatively through the second and third linear feed axes X, Y to perform machining of the work W by means of the tool T, the machine tool controls the first rotational feed axis C such that a rotational axis line of the second rotational feed axis A is perpendicular to the direction of relative movement of the perpendicular to the direction of relative movement of the tool T to the work W, and controls a power supplied to a motor for the second rotational feed axis A when a torque around the second rotational feed axis A exceeds a specified threshold.

3 Claims, 3 Drawing Sheets

MACHINING METHOD AND MACHINE TOOL

TECHNICAL FIELD

The present invention relates to a machine tool. More particularly, the present invention relates to a machining method and a machine tool, improved to prevent a machine tool from being damaged by an overload due to a collision of a tool with a workpiece or by a breakage of a tool.

BACKGROUND ART

An excessively large force may be applied to a main spindle of a machine tool such as an NC milling machine, when a tool is broken during a process for machining a workpiece or when a tool collides with the workpiece.

In order to prevent the above problems, for example, JP-A-3-3687 discloses a method of preventing collision of a body driven by a servomotor. According to the method, when collision is detected, the servomotor receives a predetermined speed command, the direction of which is reverse to that of the actual speed of the servomotor, for a predetermined period of time so as to reverse the servomotor.

DISCLOSURE OF THE INVENTION

However, in the above prior art, since the reverse command is given to the servomotor after collision has been detected, the driven body continues to move in the previous direction even after the collision. Therefore, it is impossible to completely prevent breakage of the machine tool.

Therefore, the present invention is directed to solve the above problems of the prior art, and the object of the present invention is to provide a machine tool and a machining method improved to surely prevent a machine tool from damage at the time of breakage of a tool or collision of a tool with a workpiece.

In order to accomplish the above object, the present invention provides a machining method executed with a five-axis machine tool having orthogonal first, second and third linear feed axes and orthogonal first and second rotary feed axes, the first rotary feed axis being parallel to the first linear feed axis, comprising the steps of controlling the first rotary feed axis so as to maintain a rotational axis line of the second rotary feed axis perpendicular to the feed direction of a tool relative to a workpiece while the tool and the workpiece are relatively moved along the second and the third linear feed axes and the workpiece is machined with the tool; and de-energizing a second rotary feed axis motor when the degree of torque about the second rotary feed axis or the electric current to the motor exceeds a predetermined threshold value.

According to another feature of the present invention, there is provided a machining method executed with a five-axis machine tool having orthogonal first, second and third linear feed axes and orthogonal first and second rotary feed axes, a rotational axis line of the first rotary feed axis being parallel to the first linear feed axis, the machine tool including a table for fixing a workpiece; a main spindle for holding a tool so that the tool faces the table; a spindle head for holding the main spindle for rotation; and first and second feed motors for rotating the spindle head about the first and the second rotary feed axes; the method comprising the steps of controlling the first rotary feed motor so as to maintain a rotational axis line of the second rotary feed axis perpendicular to the feed direction of a tool relative to a workpiece while the tool and the workpiece are relatively moved along the second and the third linear feed axes and the workpiece is machined with the tool; and cutting off the power supply to the second rotary feed motor when the electric current to the motor exceeds a predetermined threshold value in order to maintain the spindle head at the predetermined rotational position.

Further, according to another feature of the present invention, there is provided a five-axis machine tool having orthogonal first, second and third linear feed axes and orthogonal first and second rotary feed axes, a rotational axis line of the first rotary feed axis being parallel to the first linear feed axis, comprising: a table for fixing a workpiece; a main spindle for holding a tool so that the tool faces the table; a spindle head for holding the main spindle for rotation; a first and a second feed motor for rotating the spindle head about the first and the second rotary feed axes; means for controlling the second feed motor so that the spindle head can be maintained at a predetermined rotational position about the second rotary feed axis; means for controlling the first rotary feed motor to maintain a rotational axis line of the second rotary feed axis perpendicular to the feed direction of the tool with respect to a workpiece during the tool and the workpiece are moved relative to each other in the second and third linear feed axes to machine the workpiece with the tool; and means for cutting off the supply of electric power to the second rotary feed motor when the electric current to the second rotary feed motor exceeds a predetermined value in order to maintain the spindle head at the predetermined rotation position about the second rotary feed axis.

THE MOST PREFERRED EMBODIMENT

Figure 1:
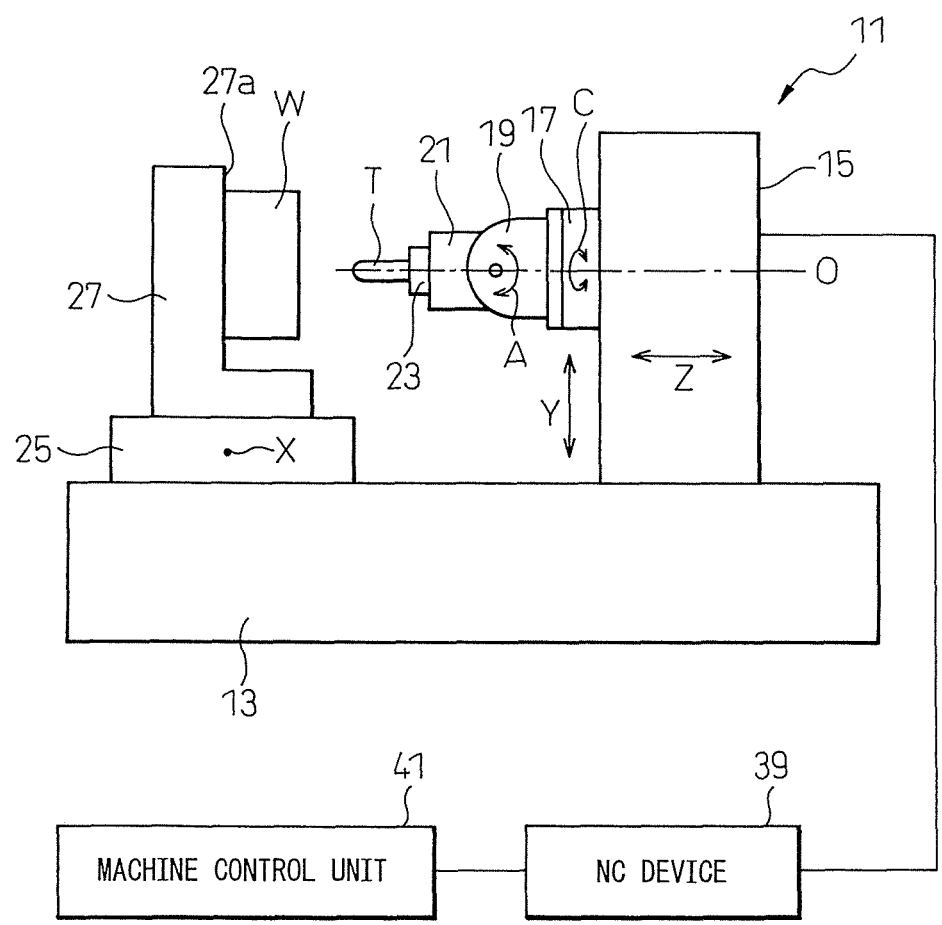
FIG. 1 is a schematic side view of a machine tool of the preferred embodiment of the present invention.

Referring to FIG. 1, a machine tool 11 according to a preferred embodiment of the present invention is a five-axis NC milling machine which comprises a bed 13 fixed onto a floor of a factory. A column 15 is mounted to the upper face of the bed 13 for linear motion relative to the bed 13 in a horizontal longitudinal direction (the direction of Z-axis, i.e., the right-and-left direction in FIG. 1). A head stock 17 is mounted to the front face of the column 15 for linear motion relative to the column 15 in the vertical direction (the direction of Y-axis, i.e., the up-and-down direction in FIG. 1).

Although not shown in detail in the drawing, the machine tool 11 includes X-, Y- and Z-axis feed motors for moving a workpiece W relative to a tool T in the directions of X-, Y- and Z-axes, an NC device 39 for controlling the X-, Y- and Z-axis feed motors, and a machine control unit 41 which reads a machining program and sends motion commands to the NC device 39 and tool change commands to the machine tool 11, respectively.

A swivel base 19 is mounted to the head stock 17 for rotation about Z-axis, i.e., C-rotary axis. Incorporated in the head stock 17 are a C-rotary axis feed motor 35 (shown in FIG. 2) for rotating the swivel base 19 about the C-rotary axis and a rotary encoder 37 for reading the rotational position of the swivel base 19 about the C-rotary axis. In order to hold the swivel base 19 at a predetermined rotational position about the C-rotary axis, a braking device (not shown) may be provided. Preferably, an electromagnetic brake may be provided.

Figure 2:
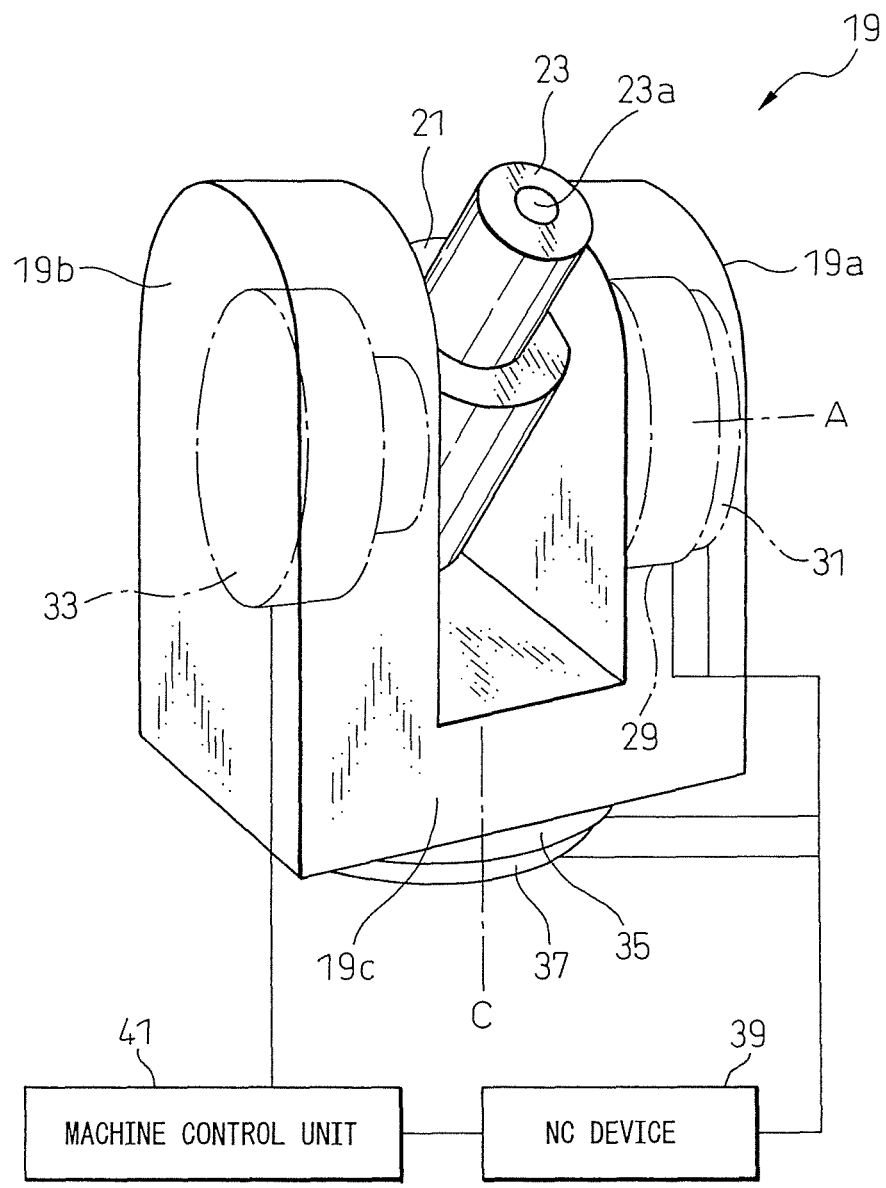
FIG. 2 is a schematic perspective view of a swivel base of the machine tool of FIG. 1 shown together with a spindle head and a main spindle.

As shown in FIG. 2, the swivel base 19 includes a housing defining a pair of arm portions 19a and 19b arranged in parallel and a base portion 19c connecting the arm portions 19a and 19b. A spindle head 21 is connected between the pair of arms 19a, 19b for rotation about a rotary feed axis (A-rotary axis) perpendicular to the C-rotary axis. Incorporated in the swivel base 19 are an A-rotary axis feed motor 29 for rotating the spindle head 21 about the A-rotary axis and a rotary encoder 31 for reading the rotational position of the spindle head 21 about the A-rotary axis. In addition to the A-rotary axis feed motor 29, a braking device, preferably an electromagnetic brake 33 for fixing the spindle head 21 at an rotational position about the A-axis may be provided.

The A-rotary axis feed motor 29 and the C-rotary axis feed motor 35 are controlled by the NC device 39. Further, the braking device 33 may be controlled by the machine control unit 41.

The spindle head 21 rotatably holds a main spindle 23 having a tool attaching hole 23a used for attaching the tool T. A main spindle motor (not shown) for rotationally driving the main spindle 23 is incorporated in the spindle head 21. The main spindle 23 defines a rotary axis O, which is parallel to the Z-axis when the spindle head 21 is positioned at a neutral position relative to the swivel base 19.

At a front portion of the column 15 on the upper face of the bed 13, a table 25 is mounted for linear motion relative to the bed 13 in a horizontal direction perpendicular to the Z-axis (the direction of X-axis perpendicular to the plane of FIG. 1). Mounted to the upper face of the table 25 is a workpiece mount 27 defining a mounting face 27a to which a workpiece W is fixed.

Figure 3:
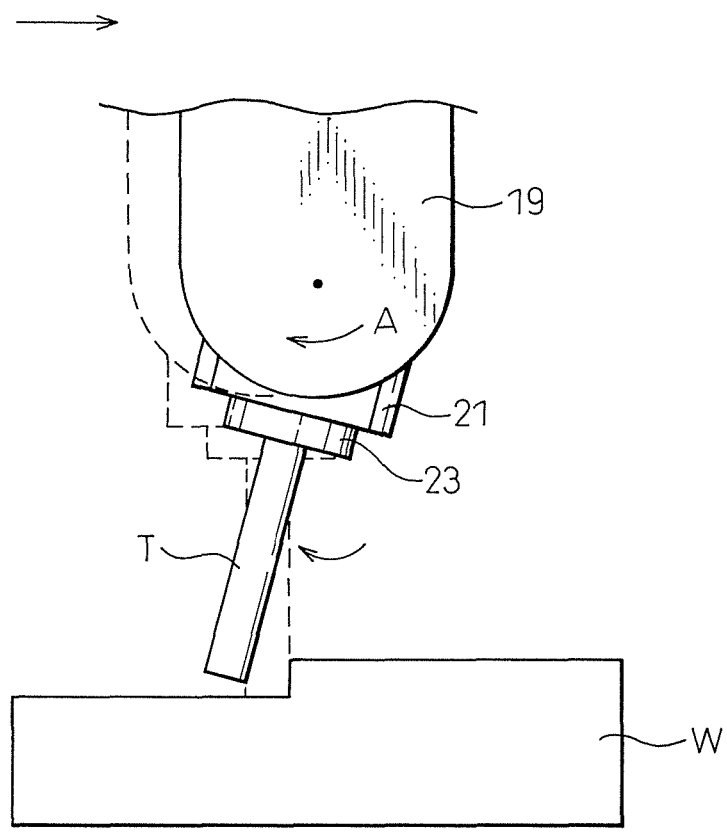
FIG. 3 is a schematic illustration for explaining an action of a spindle head at the time of collision of a tool with a workpiece.
Figure 4:
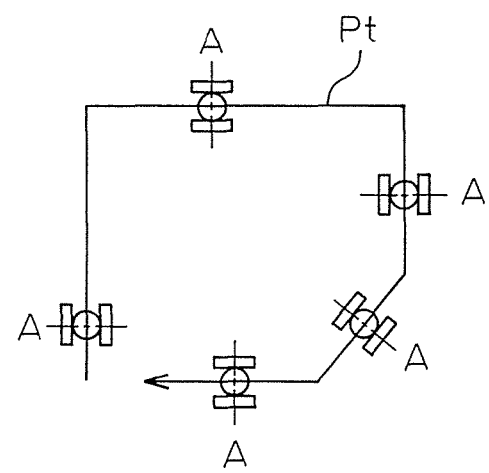
FIG. 4 is a diagram showing a relationship between a tool route and the orientation of A-rotary axis for explaining a machining method in the most preferred embodiment of the present invention.

With reference to FIGS. 3 and 4, the operation of the present embodiment will be explained below.

In the machine tool 11, while the tool T and the workpiece W are relatively moved at least in the directions of the X- and Y-axes, the tool T engages with the workpiece W to machine it. In FIG. 4, polygonal line Pt indicates a tool route in the cutting process. In the cutting process, the A-rotary axis feed motor 29 is controlled by the NC device 39 so that the spindle head 21 can be maintained at a predetermined rotational position about the A-rotary axis, for example, so that the spindle head 21 can be maintained at a neutral position where the central axis of the tool T becomes parallel with the Z-axis. According to the present embodiment, the C-rotary axis feed motor 35 is controlled by the NC device 39 so that the A-rotary axis can be perpendicular to the movement direction Pt of the tool T in the machining process.

In the machining process, the machine control unit 41 continues to monitor the electric power supplied to the A-rotary axis feed motor 29. According to the present embodiment, the machine control unit 41 will send a command to the NC device to cut off the electric power supplied to the A-rotary axis feed motor 29, when breakage of the tool T or collision of the tool T with the workpiece W occurs and the electric current to the A-rotary axis feed motor 29 exceeds a predetermined threshold value in order to maintain the spindle head 21 at a predetermined angular position about the A-rotary axis.

In the embodiment provided with the braking device 33 on the A-rotary axis, the machine control unit 41 monitors the torque acting on the braking device 33 about the A-rotary axis, and when the torque exceeds a predetermined threshold value, the machine control unit 41 releases the braking device 33, and at the same time, cuts off the electric power supplied to the A-rotary axis feed motor 29.

Further, it may be preferable that the A-rotary axis is controlled so as to move the tool T in the reverse direction to the previous feed direction Pt when the electric current supplied to the A-rotary axis feed motor 29 or the degree of torque about the A-rotary axis exceeds a predetermined threshold value.

Thus, according to the present embodiment, as shown in FIG. 3, the tool T is rotated about the A-rotary axis together with the spindle head 21 whereby the machine tool 11 is prevented from being damaged when collision of the tool T with the workpiece W or breakage of the tool T occurs.

In this connection, FIG. 1 shows a horizontal type NC milling machine. However, a person skilled in the art may envisage that the present invention can be applied to a vertical type NC milling machine.

The invention claimed is:

1. A machining method executed with a five-axis machine tool having orthogonal first, second and third linear feed axes and orthogonal first and second rotary feed axes, a rotational axis line of the first rotary feed axis being parallel to the first linear feed axis, comprising the steps of:
    controlling the first rotary feed axis so as to maintain a rotational axis line of the second rotary feed axis perpendicular to the feed direction of a tool relative to a workpiece while the tool and the workpiece are relatively moved along the second and the third linear feed axes and the workpiece is machined with the tool; and
    de-energizing a second rotary feed axis motor when the degree of torque about the second rotary feed axis or the electric current to the motor exceeds a predetermined threshold value.

2. The machining method according to claim 1, wherein the second rotary feed axis is controlled so that the tool can be moved in a direction reverse to the relative moving direction when an intensity of torque or an electric current of the motor about the second rotary feed axis exceeds a predetermined threshold value.

3. A five-axis machine tool having orthogonal first, second and third linear feed axes and orthogonal first and second rotary feed axes, a rotational axis line of the first rotary feed axis being parallel to the first linear feed axis, comprising:
    a table for fixing a workpiece;
    a main spindle for holding a tool so that the tool faces the table;
    a spindle head for holding the main spindle for rotation;
    a first and a second feed motor for rotating the spindle head about the first and the second rotary feed axes;
    means for controlling the second feed motor so that the spindle head can be maintained at a predetermined rotational position about the second rotary feed axis;
    means for controlling the first rotary feed motor to maintain a rotational axis line of the second rotary feed axis perpendicular to the feed direction of the tool with respect to a workpiece during the tool and the workpiece are moved relative to each other in the second and third linear feed axes to machine the workpiece with the tool; and
    means for cutting off the supply of electric power to the second rotary feed motor when the electric current to the second rotary feed motor exceeds a predetermined value in order to maintain the spindle head at the predetermined rotation position about the second rotary feed axis.

\* \* \* \* \*